(12) United States Patent
White et al.

(10) Patent No.: US 8,739,941 B2
(45) Date of Patent: Jun. 3, 2014

(54) STACKABLE TRAILER JACK LEVELING APPARATUS

(76) Inventors: John White, Springfield, PA (US); Nancy White, Springfield, PA (US)

(*) Notice: Subject to any disclaimer, the term of this patent is extended or adjusted under 35 U.S.C. 154(b) by 258 days.

(21) Appl. No.: 13/271,132

(22) Filed: Oct. 11, 2011

(65) Prior Publication Data

US 2012/0090925 A1 Apr. 19, 2012

Related U.S. Application Data

(60) Provisional application No. 61/394,410, filed on Oct. 19, 2010.

(51) Int. Cl.
*B60T 3/00* (2006.01)

(52) U.S. Cl.
USPC ......... 188/32; 14/69.5; 248/352; 248/346.01; 248/188.2

(58) Field of Classification Search
USPC .................... 188/32; 248/352, 346.01, 188.2; 14/69.5
See application file for complete search history.

(56) References Cited

U.S. PATENT DOCUMENTS

| | | | | | |
|---|---|---|---|---|---|
| 2,184,061 | A | * | 12/1939 | Skroback | 254/88 |
| 3,661,229 | A | * | 5/1972 | Stonhaus | 188/32 |
| 4,073,454 | A | * | 2/1978 | Sauber | 248/188.2 |
| 4,135,335 | A | * | 1/1979 | Jensen | 52/126.1 |
| 4,165,862 | A | * | 8/1979 | Bennett | 254/88 |
| 4,776,548 | A | * | 10/1988 | Bezenek | 248/188.2 |
| 5,033,146 | A | * | 7/1991 | Fogarty et al. | 14/69.5 |
| 5,046,587 | A | | 9/1991 | Jones | |
| D347,502 | S | * | 5/1994 | Mazza | D34/32 |
| 5,527,054 | A | | 6/1996 | Williams | |
| 5,755,430 | A | | 5/1998 | Couch | |
| 6,517,051 | B1 | * | 2/2003 | Cavanaugh | 254/88 |
| 6,539,572 | B2 | * | 4/2003 | Ware | 14/69.5 |
| 6,718,588 | B1 | * | 4/2004 | Frederiksen | 14/69.5 |
| 6,793,041 | B1 | * | 9/2004 | Taylor | 182/200 |
| 6,874,745 | B1 | | 4/2005 | Bean | |
| 6,910,675 | B1 | * | 6/2005 | Cox | 254/1 |
| 6,993,801 | B2 | * | 2/2006 | Marko et al. | 14/69.5 |
| 7,000,740 | B2 | * | 2/2006 | Chrisco et al. | 188/32 |
| 7,073,777 | B2 | * | 7/2006 | Branstetter | 254/88 |
| 7,104,524 | B1 | * | 9/2006 | Hidding et al. | 254/88 |
| 7,350,255 | B2 | * | 4/2008 | Zhang | 14/69.5 |
| 7,520,483 | B2 | * | 4/2009 | Rand et al. | 248/346.11 |
| 7,690,080 | B1 | * | 4/2010 | Coffman, II | 16/82 |
| 7,784,751 | B1 | * | 8/2010 | Bellows et al. | 248/188.2 |
| D644,402 | S | * | 8/2011 | Shoup et al. | D34/32 |
| 8,060,965 | B2 | * | 11/2011 | Yang et al. | 14/69.5 |
| 8,136,308 | B2 | * | 3/2012 | Slott et al. | 52/126.1 |
| 8,297,567 | B1 | * | 10/2012 | Bellows et al. | 248/188.2 |
| 2005/0132511 | A1 | * | 6/2005 | Berg | 14/69.5 |

* cited by examiner

*Primary Examiner* — Thomas Irvin
(74) *Attorney, Agent, or Firm* — Daniel Boudwin; Global Intellectual Property Agency LLC

(57) ABSTRACT

Disclosed is a trailer leveling support, comprising a plurality of wedge shaped pads for supporting a trailer parked on an angled surface. The upper portion of the wedge is provided in a flat configuration to allow placement of any trailer accessory, while the base surface is provided at an angle with respect to the upper surface, allowing the base to rest against an angled support surface while the upper surface is positioned in a level configuration. The pads may be stacked to achieve the desired angle based on the trailer support surface. The device also includes a strap for securing the pads together, or to the trailer for added stability. The footprint of the device occupies a sufficient surface area to distribute the weight of the trailer over a larger area to prevent the trailer tongue from sinking into a soft surface.

9 Claims, 3 Drawing Sheets

STACKABLE TRAILER JACK LEVELING APPARATUS

CROSS REFERENCE TO RELATED APPLICATION

This application claims the benefit of U.S. Provisional Application No. 61/394,410 filed on Oct. 19, 2010, entitled "Tongue Jack Leveling Kit."

BACKGROUND OF THE INVENTION

1. Field of the Invention

The present invention relates generally to the field of unpowered trailers. More specifically, the present invention pertains to a wheel chock for supporting a trailer in a level configuration despite being parked on an angled surface.

A trailer is a type of unpowered vehicle that is pulled by a powered vehicle. Some typical examples are trailers used to transport goods, boats, horses, or mobile homes. Trailers generally have two to four wheels, and attach to another vehicle by a tongue hitch. When a trailer is not attached to a powered vehicle, it is supported by a trailer tongue jack, which lifts the trailer hitch to a specified height that allows the trailer to be hitched or unhitched from a towing vehicle. Trailer tongue jacks are also used for leveling the trailer during storage, however they are unable to level a trailer parked on an angled ground, such as a driveway with a large percent gradient. Additionally, the wheel attached to a trailer tongue jack occupies a small footprint, making it susceptible to sinking into a soft surface when parked thereon.

Several devices are disclosed in the prior art that support and level a trailer parked on an angled surface. These devices, however, do not provide a sufficient footprint at the interface between the ground and trailer jack to prevent the trailer jack from sinking into a soft ground surface. Other devices have been disclosed to prevent a trailer jack from sinking into a soft surface; however, they are not adapted to leveling a trailer parked on a steep gradient. Devices such as a wheel chock can support a trailer on a soft surface, but cannot level a trailer parked on a slope.

The present invention discloses a trailer leveling support comprised of a plurality of stackable, wedge shaped pads for supporting a trailer parked on an angled surface. The upper portion of the wedge is provided in a flat configuration to allow placement of any trailer accessory, such as a recessed support area for securing a trailer jack wheel, while the base surface is provided at an angle with respect to the upper surface, allowing the base surface to rest against an angled support surface while the upper surface is positioned in a level configuration. The wedge shaped pads may be stacked as needed to achieve the desired angle based on the trailer support surface. The device also includes a strap for securing the pads together, and the pads to the trailer for added stability and security. The footprint of the device occupies a sufficient surface area to prevent the trailer from sinking into a soft surface, distributing the weight of the trailer over a larger area and preventing the trailer tongue from sinking.

2. Description of the Prior Art

Several devices have been disclosed in the art that support an unpowered trailer parked on an angled surface. Williams, U.S. Pat. No. 5,527,054 discloses an adjustable length leg and foot assembly incorporated in a lifting/leveling leg for a fifth-wheel trailer. The foot is connected to the lower end of a threaded shaft, which in turn is received at its upper end by a nut welded to a U-shaped bracket on the leg. This enables the foot to be raised and lowered in infinite increments and avoids any need for insertion of boards or shims in making final leveling adjustments. Jones, U.S. Pat. No. 5,046,587 discloses a wheel chock with a base, upwardly sloped ramps extending around the periphery of the base, and a receiver located inboard of the ramps for releasably retaining a wheel and supporting the load thereon. The ramps and receiver permit wheel approach around the entire periphery of the base. While these devices may be useful for supporting a trailer on an unlevel surface, their structure significantly diverges from the present invention, wherein the support is affixed to a trailer and is raised and lowered by a threaded shaft attached to a pad. The present invention is not permanently affixed to a trailer, and can additionally provide sufficient support for a trailer parked on a soft surface.

Other devices disclosed in the prior art claim a wheel chock for a trailer to support a fifth wheel trailer jack stand. Bean, U.S. Pat. No. 6,874,745 discloses a device to secure a jack pad for supporting the jack of a trailer so that the jack does not sink into the ground when it is not being used. The device receives and supports trailer jacks having various configurations so that one device may be used with a number of differently configured trailer jacks. Couch, U.S. Pat. No. 5,755,430 discloses a trailer jack leveling adapter for improving a fifth wheel trailer jack stand having a pair of downwardly telescoping leg assemblies whereby one of the leg assemblies may be adjusted to compensate for an uneven supporting surface for leveling the trailer. The trailer jack leveling adapter comprises a connector fixedly attached to a lower end of a leg assembly. An elongated leg extension is longitudinally adjustably engaged with the connector. While such devices provide a support for a trailer jack stand, they do not allow for adjustment based on the percent gradient of the surface the trailer is parked thereon.

While effective at supporting a trailer parked on an angled or soft surface, these prior art devices have several known drawbacks. These devices are height adjustable for supporting a trailer on an angled surface, but do not have a sufficiently large surface area for preventing the support from sinking into soft ground. Other devices have a surface area large enough to prevent the trailer from sinking, but are not adapted to leveling the trailer on an unlevel surface. The present invention provides a support device with a surface area large enough for preventing a trailer from sinking into the ground, and also allows for leveling based on the percent gradient of the surface parked thereon. The present invention substantially diverges in design elements from the prior art and consequently it is clear that there is a need in the art for an improvement to existing trailer leveling support devices. In this regard the instant invention substantially fulfills these needs.

SUMMARY OF THE INVENTION

In view of the foregoing disadvantages inherent in the known types of trailer leveling support devices now present in the prior art, the present invention provides a new trailer leveling support devices wherein the same can be utilized for providing convenience for the user when parking a trailer on an angled or soft surface.

It is therefore an object of the present invention to provide a new and improved trailer leveling support device that has all of the advantages of the prior art and none of the disadvantages.

Another object of the present invention to provide a new and improved trailer leveling support device that supports a trailer that is not attached to a powered vehicle.

Another object of the present invention is to provide a new and improved trailer leveling support device that levels a trailer parked on an angled ground.

Yet another object of the present invention is to provide a new and improved trailer leveling support device that prevents a trailer from sinking into a soft surface when parked thereon.

Another object of the present invention is to provide a new and improved trailer leveling support device that includes a plurality of angled wedges that are at an angle with respect to one another, allowing a plurality of wedged pads to form a column of pads that are easily transported and handled.

Another object of the present invention is to provide a new and improved trailer leveling support device that includes a strap for securing the support and the trailer together, providing additional security thereto.

Another object of the present invention is to provide a new and improved trailer leveling support device that is easy to make and inexpensive to manufacture.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 2:
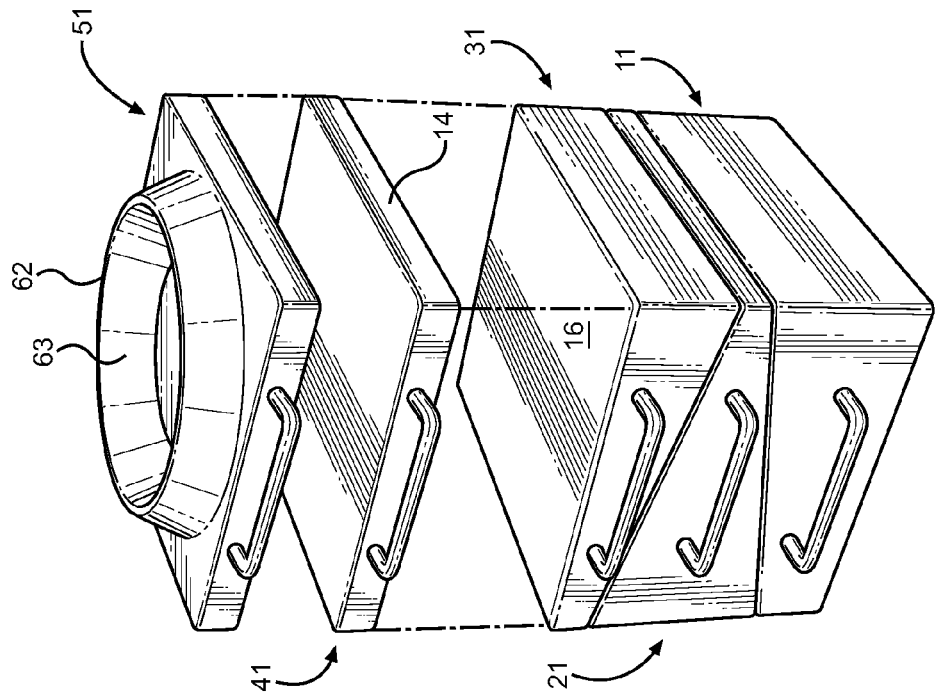
FIG. 2 shows a perspective view of the present invention, comprising a plurality of wedge shaped pads forming a column, as well as an exploded view of an extension member and wheel chock aligned thereon.

Reference is made herein to the attached drawings. Like reference numerals are used throughout the drawings to depict like or similar elements of the trailer leveling support device. For the purposes of presenting a brief and clear description of the present invention, the preferred embodiment will be discussed as used for supporting a trailer tongue in a level configuration when parked on a slope. The figures are intended for representative purposes only and should not be considered to be limiting in any respect.

Figure 1:
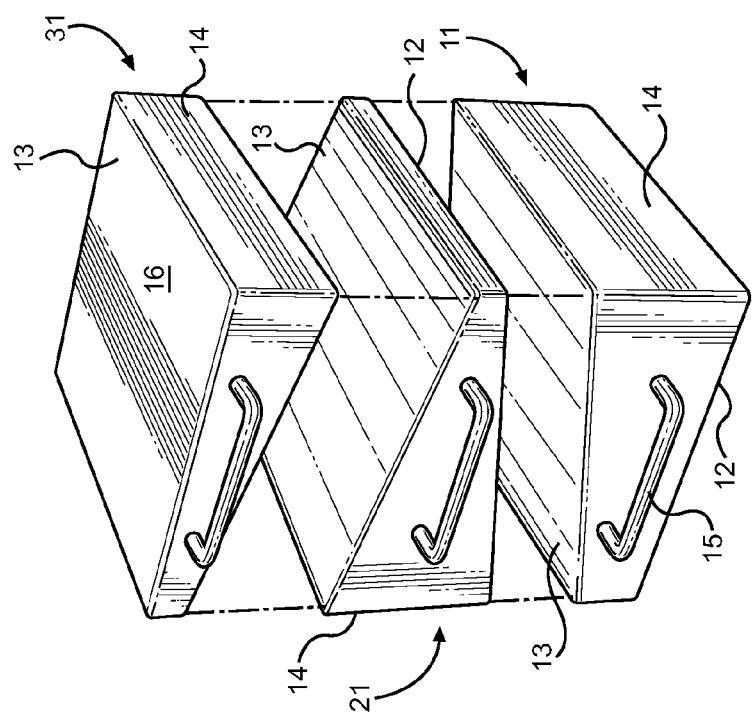
FIG. 1 shows an exploded view of the present invention, comprising a plurality of wedge shaped pads forming a column.

Referring now to FIG. 1, there is shown a perspective view of the present invention, comprising a plurality of angled wedge pads 11, each having an upper planar face 13 and a lower planar face 12 separated by a given distance to form an angled wedge. The wedge pad 11 is a hexahedron shape with vertical sidewalls 14 that span a gap between the two planar faces. The lower face 12 is adapted to rest against a ground surface, while the upper face 13 is provided at an angle with respect to the lower face 12, allowing the lower face 12 to rest against an angled support surface while the upper surface is positioned in a level configuration. This provides a means to create a level support surface 16 on an otherwise angled or sloping ground surface. The upper face of the wedge 13 may be used in conjunction with any trailer accessory, such as a trailer jack wheel or trailer tongue jack base plate, an extension member, or further stackable devices that may provide fitment for a trailer tongue jack wheel assembly or other trailer accessory requiring support.

The upper face 13 and lower face 12 are positioned at an angle with respect to one another to provide a support surface forming a level placement and positioning for an item placed on the upper face while in a working position on a sloped ground surface. On angled or sloped terrain, the pad may be utilized to provide a level support surface, wherein the angle between the pad upper and lower faces equals the downward slope of the ground surface measured from a horizontal plane.

The angle of the wedge is not adjustable, which eliminates any moving parts and added complexity, therefore a plurality of wedge angles may be constructed and provided for a user to create a level working surface on hills with differing angles. A plurality of wedges 11, 21, 31, each with different angles, may be utilized together or provided together for a user. The plurality of angled wedges 11, 21, 31 can be stacked to form a column of pads comprising various angles that are easily transported and handled. A plurality of wedges 11 may be provided that are stackable to allow wedges of different angles to be transported to a specific site, without prior knowledge of the terrain or grade thereof. The ability to stack several wedges 11, 21, 31 together allows a user to easily transport several different angled pads together and in a convenient configuration. Each wedge contains a pair of handles 41 on opposing sides, making for ease of transport and handling, along with allowing for attachment of a securing strap. The strap 42 secures the wedges 11 together for transport, or alternately secures the wedge 11 to a trailer jack tongue, thereby providing additional support, stability and security of the pads when left unoccupied and in use.

Referring now to FIG. 2, there is shown a perspective view of the present invention, comprising a plurality of wedge shaped pads 11, 21, 31 stacked in a column, as well as an exploded view of an extension member 51 and wheel chock 61 aligned thereon. The extension member 51 comprises a device having a hexahedron shape and a planar upper and lower face, along with and substantially smaller side faces connected between the upper and lower faces. An extension member 51, such as shown in FIG. 2, is a non-angled pad that may be used to raise the working surface of the upper surface of the angled pad, or may be used alone to support a trailer tongue jack that is positioned on a flat, soft surface. The article placed on the upper face of the angled pad is not desired to be limited to a specific object, alternatively it is contemplated that any object requiring support or in furtherance of supporting an article may be used in connection with the angled pad upper surface 16. The footprint of angled pad lower surface occupies a sufficient surface area to prevent the trailer from sinking into a relatively soft ground surface, distributing the weight of the trailer over a large surface area and preventing the weight of a supported object from depressing the pad into the ground.

A plurality of angled pads may be utilized to create a working surface 16 at a desired angled if a singular pad is insufficient at creating the required angle. A plurality of angled pads 11, 21, 31, each with different angles between their respective upper and lower surfaces may be provided to a user in the form of a kit or stack pads. Varying angle combinations of pads may be stacked to create intermediate angles to achieve a level working surface 16 on the upper most pad. It may be desired that all pads provided in a given kit create a vertical column; however it is not desired to limit the present invention or kit to this requirement. In order to provide sufficiently differing angles within a stack of pads, the sum of all pad interior angles would have to equal 180 degrees (a straight line). Alternative embodiments of a pad kit may include an insufficient number of pads or interior angles to achieve 180 exactly, or pads that add up to greater or less than 180 degrees, creating a column of pads that when stacked are not vertically aligned, but exhibit a skewed profile. It is not desired to limit the quantity, size or interior angle of each pad within a given set of pads, but to establish an example embodiment wherein the stack of angled pads is vertical, which facilitates improved storage and handling.

Any object or support article may be placed on or utilized in conjunction with the upper most working surface 16, including a wheel chock pad 51 with a recessed support area for securing a trailer jack wheel, a level extension member 51 or a plurality of additional angled pads 11. A wheel chock 51 is similar in shape to a level extension member 41, having a planar lower surface; however the wheel chock 51 further comprises a raised annular lip 62 with a recessed area 63 for receiving a wheel therein. The annular raised lip 62 creates a recessed support area surrounding the wheel to secure the wheel and prevent it from rolling. If the wheel begins to roll, it will encounter the raised lip 62, which prevents the wheel from moving, thereby providing safety and security thereto.

Figure 3:
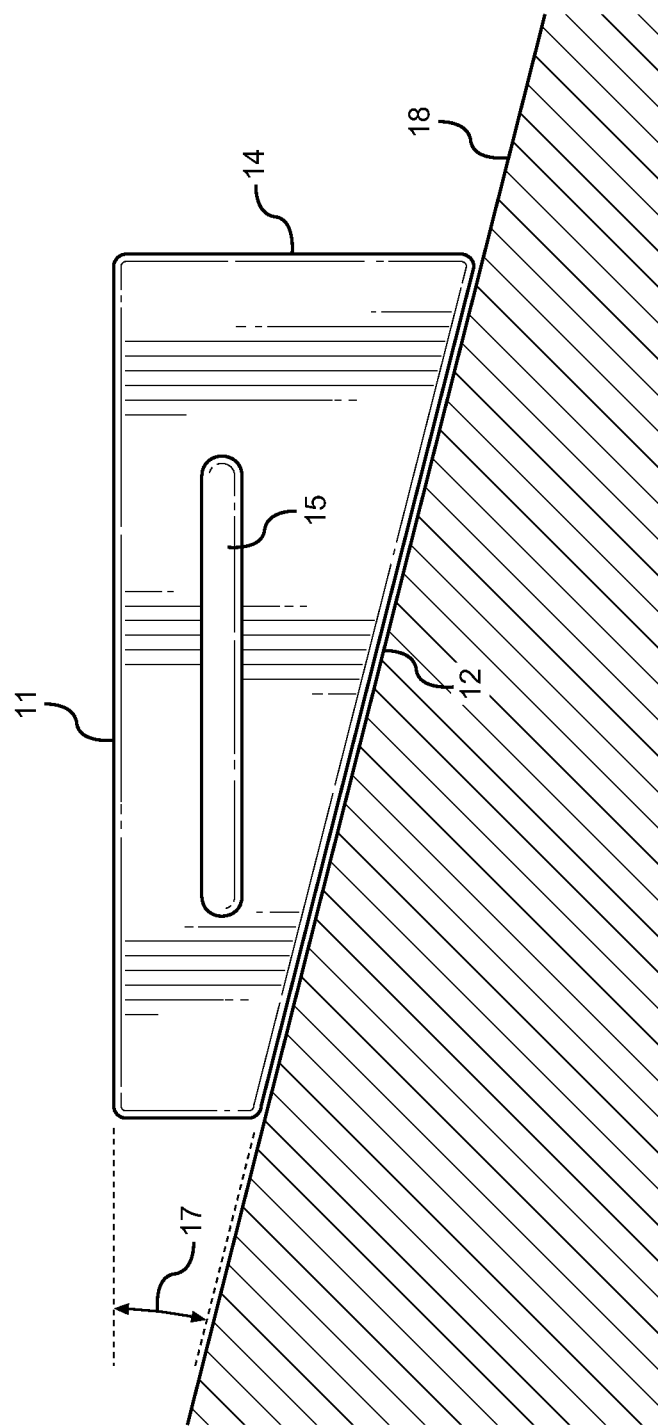
FIG. 3 shows a profile side view of an angled pad as described by the present invention.

Referring now to FIG. 3, there is shown a profile side view of an angled pad as described by the present invention. The angled pad comprises a lower 12 and upper 11 face, connected by four upstanding sidewall faces 14. The upper and lower faces are disposed at an angled with regard to one another, forming two planes oriented at an angle 17 originating at their intersection. The lower face 12 is adapted to rest against a ground surface 18, whereby the angle 17 provided by the upper face is equal to the grade of the ground surface 18, creating a level upper face 11 that may be utilized for supporting articles thereon. The sidewall faces 14 provide a structural support for the wedge, as well as an offset between the upper 13 and lower 12 faces such that the upper face 13 is held sufficiently above the ground surface 18. A pair of handles 15 is also provided along the opposing sidewalls for improved handling. The handles 15 are preferably mounted to sidewalls 14 having a wedge 2-D shape, whereby they are not positioned at differing elevations when on a sloped surface. This eliminates any interference issues between the handle 14 and the ground surface 18 uphill from the wedge. The interior of the pad may be hollow for lighter weight and less material, or alternatively the pad may be supplied as a solid block of material. The structure of either embodiment is rated for a specific payload, which will be dependent upon end user application, material and dimensions of the device.

Figure 4:
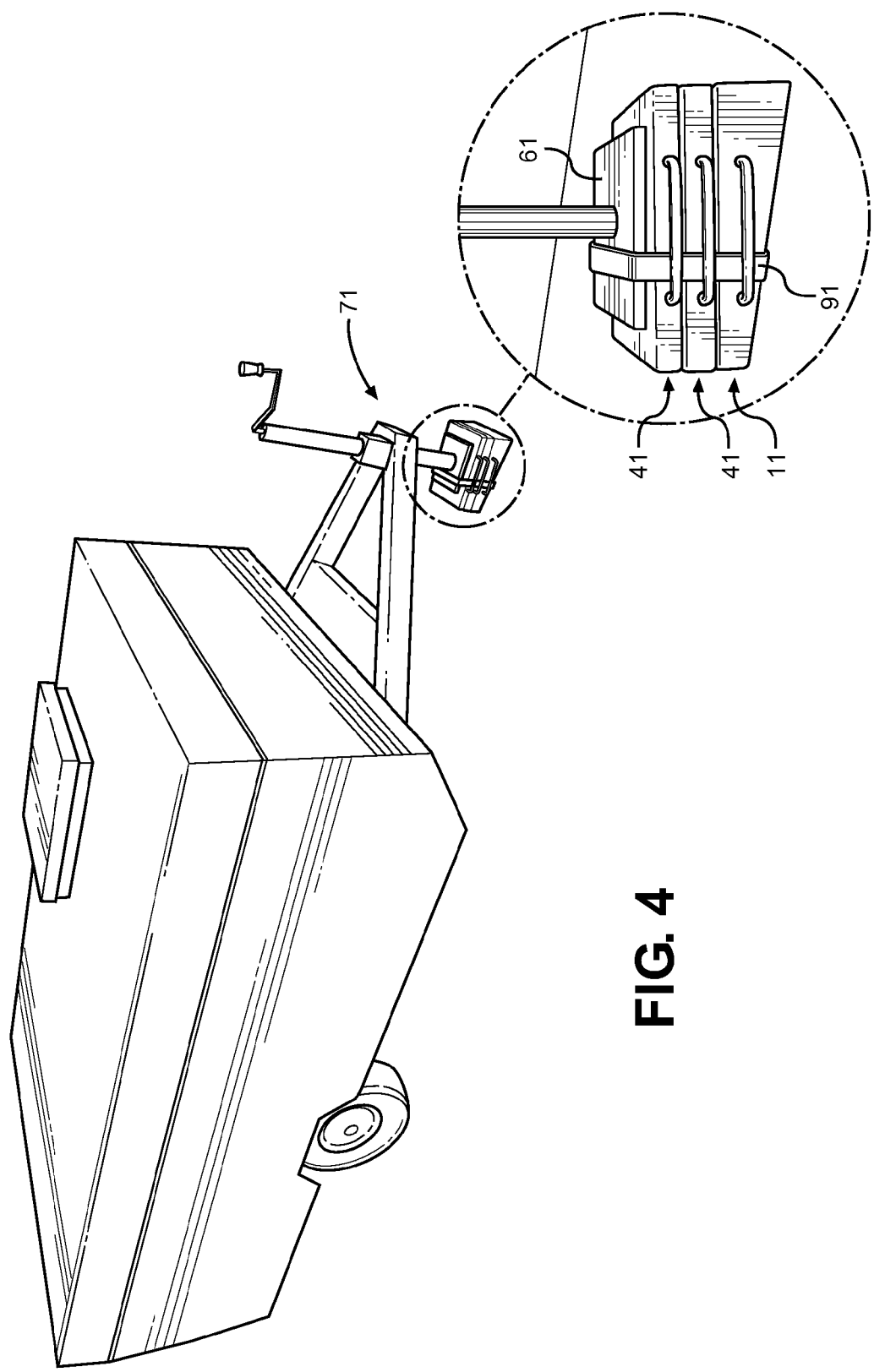
FIG. 4 shows a perspective view of the present invention, as well as a close-up view of a plurality of wedge shaped pads and a wheel chock supporting a trailer jack wheel on an angled ground.

Referring now to FIG. 4 there is shown a perspective view of the present invention, as well as a close-up view of the wedge pad 11 in a working position, supporting a trailer tongue jack pad 61 on a sloping surface. When a trailer 71 is parked on an angled or unlevel surface, such as a drive way, a wedge pad or plurality thereof may be arranged to create a level surface for supporting the trailer tongue jack or similar device requiring support. The pad 11 may be utilized independently, with a plurality of other pads to create a level working surface, or in conjunction with extensions pads 41 or other support articles that may be desired by the user. The present invention is intended to be utilized to create a level surface from a sloping ground surface, whereupon any article may be placed on its upper face for level and stable support.

To prevent a trailer from falling from the upper face of a pad 11, a securing strap or similar securing means 91 may be employed. The securing means 91 is preferably a strap, chain or cable that connects through the handle of the pad and secures it to a larger structure for prevention of theft or added stability.

The present invention provides a user with a convenient and inexpensive device for supporting an article in a level configuration, for instance a trailer tongue jack on an angled or soft surface. The plurality of angles inherent in the design of the wedges allows a user to select an appropriate configuration depending on the surface the trailer is parked on. The device can be configured to level a trailer parked on a steep percent gradient, as well as a surface with a slight angle. The footprint of the device occupies a sufficient surface area to prevent the trailer from sinking into a soft surface, adding further convenience to the user. The securing strap is used to tie the support to the trailer, thereby preventing the trailer from sliding or the pads from being stolen. This creates a safe and effective system for securing a trailer when not in use.

To this point, the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A support article, comprising:
   an angled pad having an upper and lower planar face, along with upstanding sidewalls connecting said upper and lower faces and providing an offset therebetween;
   said upper and lower faces being disposed at an angle with regard to one another, forming a generally wedge-shaped device, such that said lower face is adapted to be placed on a sloping ground surface and said upper face is adapted to provide a level working surface;
   an extension member having a planar upper and lower face and side faces, said extension member adapted to be placed on said angled pad upper face to further elevate said level working surface;
   wherein said angled pad lower face is substantially free from protuberances therefrom;
   wherein said angled pad upper face is substantially free from protuberances therefrom, such that said extension member lower face rests flushly against said angled pad upper face;
   a first and second handle disposed on opposing sidewalls and in parallel to said upper face;
   a wheel chock having an upper planar face and lower planar face separated by a given distance, along with a raised circular annular lip and a recessed area for receiving a trailer wheel therein and prevent said trailer wheel from rolling, said wheel chock adapted to be placed on said level working surface.

2. The device of claim 1, wherein said handles are disposed on opposing sidewalls with an angled configuration so not to have interference between said handles and said sloping ground surface.

3. The device of claim 1, further comprising a securing means to secure said angled pad to a larger structure supported thereon, said securing means attaching through said handle.

4. A support stand, comprising:
  a plurality of angled pads each having an upper and lower planar face, along with upstanding sidewalls connecting said upper and lower faces and providing an offset therebetween;
  each pad upper and lower faces being disposed at different angles with regard to one another, forming generally wedge-shaped devices, such that each pad is adapted to be stacked to create a cuboidal column of pads wherein said lower face of a lower-most pad is adapted to be placed on a sloping ground surface and an upper face of an upper-most pad may provide a level working surface;
  wherein said pad upper and lower faces are substantially free of protuberances therefrom;
  a first and second handle disposed on opposing sidewalls of each pad and aligned parallel to said upper face.

5. The device of claim 4, wherein said handles are disposed on opposing sidewalls with an angled configuration so not to have interference between said handles and said sloping ground surface.

6. The device of claim 4, wherein said plurality of angled pads form a vertical cuboidal column, wherein the sum of all interior angles between each upper and lower face equals 180 degrees.

7. The device of claim 4, further comprising a securing means to secure said wedges together when stacked as said cuboidal column or to a larger structure supported thereon, said securing means attaching through said handle.

8. The device of claim 4, further comprising an extension member having a planar upper and lower face and side faces, said extension member adapted to be placed on said upper-most wedge upper face to further elevate said level working surface.

9. The device of claim 4, further comprising a wheel chock having an upper planar face and lower planar face separated by a given distance, along with a raised circular annular lip and a recessed area for receiving a trailer wheel therein and prevent said trailer wheel from rolling, said wheel chock adapted to be placed on said upper-most wedge upper face to further elevate said level working surface.

* * * * *